United States Patent Office 3,514,862
Patented June 2, 1970

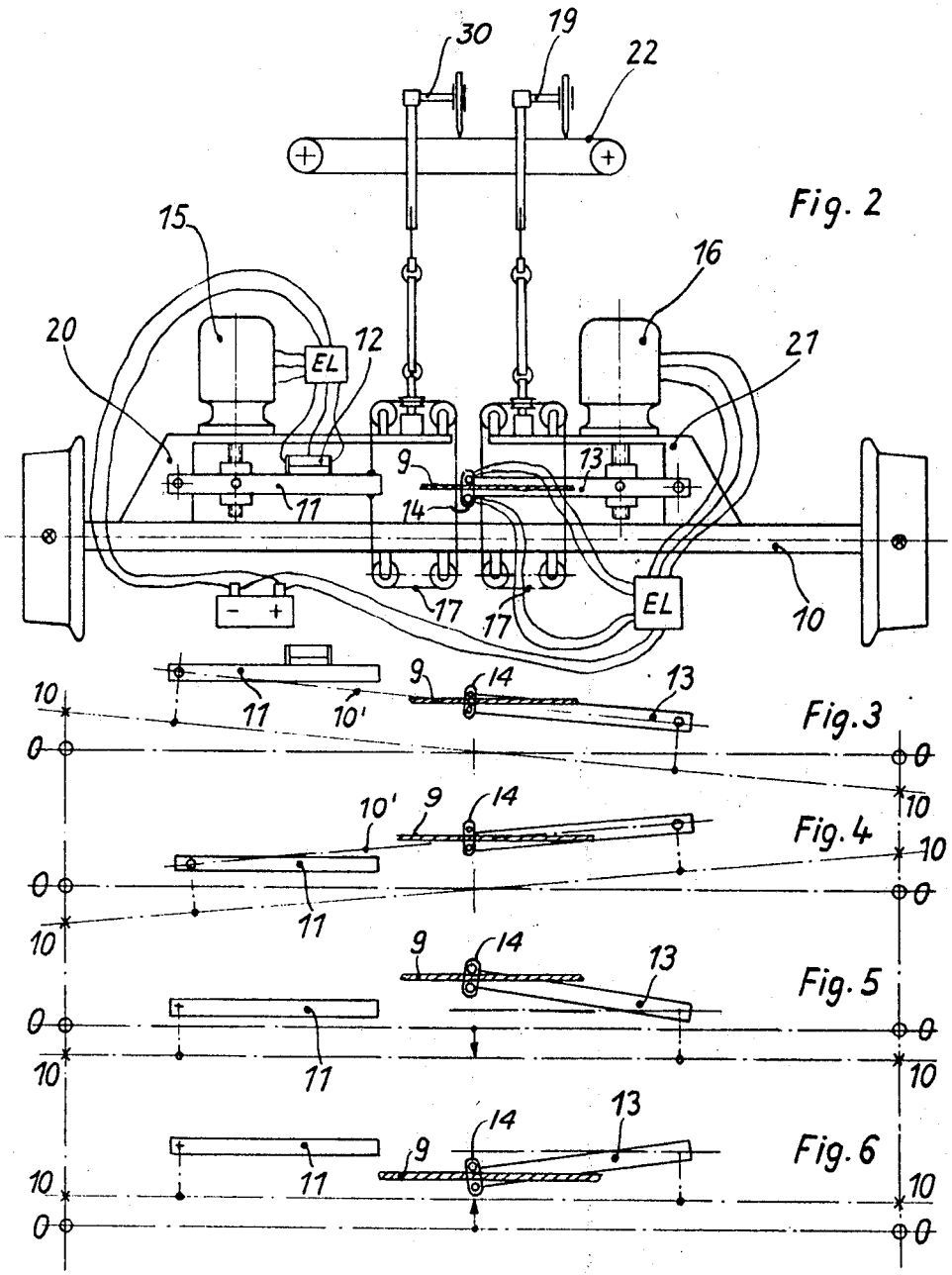

3,514,862
SUPER-ELEVATION AND GRADIENT MEASURING DEVICES FOR TRACK
Heinrich Helgemeir, Gotzingerstr. 23, Munich, Germany
Filed Sept. 19, 1967, Ser. No. 668,840
Claims priority, application Germany, Feb. 17, 1967,
R 45,315
Int. Cl. E01b 29/04
U.S. Cl. 33—60    5 Claims

ABSTRACT OF THE DISCLOSURE

Apparatus for measuring track super-elevation and the vertical rail error comprising two pairs of wheel assemblies mounted on the rails of a track in longitudinally spaced relation. The wheel pairs are each independently movable in a vertical direction and a connecting rod connects one wheel from one pair with the respective wheel of the other wheel pair on each rail. A transverse rod is connected between the centers of the two connecting rods and a measuring spindle parallel thereto is equipped with wheels riding on the track. The said spindle is provided with a level sensitive switch responsive to the super elevation of one rail with respect to the other. Means are provided for recording the aforesaid super elevation. Photoelectric means are mounted on the spindle to sense relative vertical movement between said spindle and transverse rod and means are provided for recording this vertical movement.

---

The rails of a railway track must be so positioned that the track corresponds to the track plan in the terrain. In addition, viewed from the horizontal plane, the rails must not be wavy and should really be rectilinear in a straight track section whilst, in a curved section, they should correspond to the prescribed radius of curvature. There are known track laying machines which measure the layed track from these points and correct the rail position by means of straightening members arranged in the machine, operable hydraulically for shifting the rail.

Substantially the same requirement exists with regard to the vertical positioning of the rails. French Pat. No. 657,880 describes a rail testing machine which enables it to record both the horizontal rail position and of the vertical components of the track, as well as the track width. The vertical component of the track means here both the super-elevation of both rails with regard to each other in a curve, as well as the gradient of the rails in the longitudinal direction. The main object is to indicate errors consisting of a waviness of the track in the vertical plane.

The known arrangement uses for indicating the super-elevation a pendulum arrangement, and for indicating the track waviness in the vertical plane two chords of different lengths tensioned on the machine, the chord centres of which have different heights if the chord end points are not in alignment.

The Austrian Pat. No. 2,047,899 and the associated additional application No. 9A 9,743/65 (published on Jan. 15, 1967) show measuring devices for measuring and recording the super-elevation of the track and its gradient in the longitudinal direction using communicating pipes, of which a single pair, serving for measuring the track rise or fall, is arranged in the longitudinal direction of the vehicle, whilst a pipe device serving for measuring the super-elevation is arranged in the transverse direction of the vehicle.

Both the pendulum device and the comparatively long communicating pipe arrangements have the drawback that they require damping by additional means, because otherwise only oscillating mean values are obtained.

The present invention relates to a measuring system of this kind, in which these drawbacks have been eliminated.

This invention relates to apparatus for measuring the track super-elevation and the vertical rail error and could be incorporated in a track laying or track straightening machine. The apparatus of this invention comprises two pairs of wheel assemblies mounted on the rails of a track in longitudinally spaced relation. The wheel pairs are each independently movable in a vertical direction. A connecting rod or chord connects the respective wheels of the wheel pairs on each rail and a transverse rod or chord is connected between the centers of these two connecting rods. A measuring spindle equipped with wheels riding on the track is positioned between the wheel pairs near the transverse rod and parallel thereto. The measuring spindle pivotally mounts an arm on which is positioned a water balance provided with electrical contacts. The measuring spindle also pivotally mounts an arm carrying a photo-diode of a photo-diode assembly responsive to relative movement between the measuring spindle and the transverse bar. Each pivotal arm is connected to a servo mechanism respectively responsive to the super elevation of one rail with respect to the other and the deviation in the height of the measuring spindle with respect to the transverse rod. Recording pens are operatively connected to each arm to record the aforesaid measurements.

The invention will be further described, by way of example, with reference to the accompanying drawing, in which:

FIG. 2 shows diagrammatically the measuring arrangement according to the invention;

Figure 1:
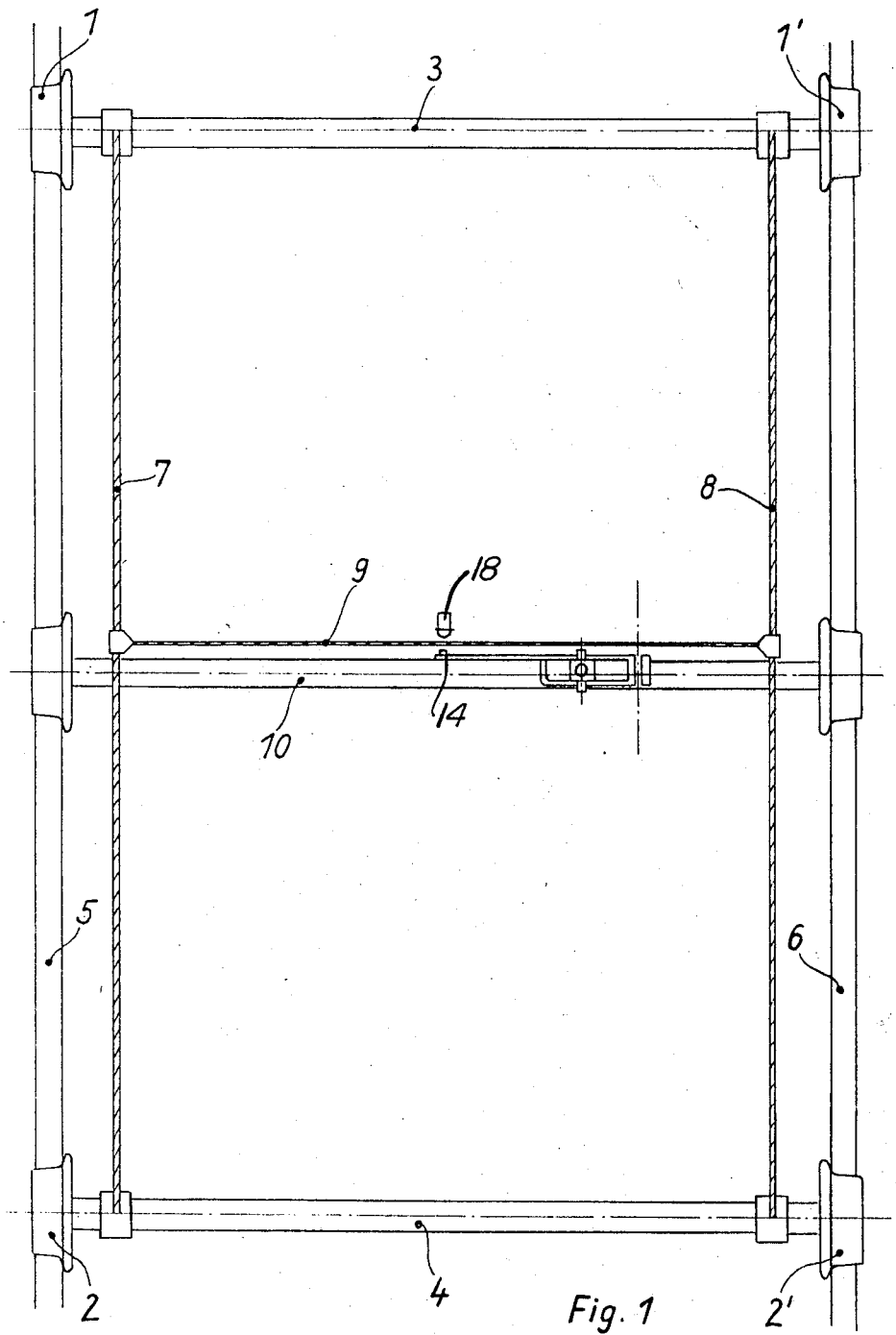
FIG. 1 is a top view of the chassis arrangement provided according to the invention.

FIGS. 3 to 6 explain the measuring principle forming the basis of the invention.

As shown in FIG. 1, the wheels 1, 1' running on the two rails 5, 6, are arranged on an axle 3. This axle 3 need not be a continuous axle and may be split. A further pair of wheels comprises the wheels 2, 2' and their axle 4. Two connecting rods 7, 8 (or ropes, if required), connect the axles 3, 4 near the wheels 1 and 2, and 1' and 2', respectively. The wheels 1, 1', 2, 2' are so arranged on the vehicle that they can assume independent vertical positions.

The centres of the rods or ropes 7, 8 are interconnected by a chord 9. A measuring spindle 10 extends parallel to the chord and has wheels which also run along the rails 5 and 6. The measuring spindle 10 is movable both in height and in inclination.

The measuring spindle 10 carries two pivotable arms 11 and 13, mounted pivotably on the posts of two bridge arms 20, 21. The arm 11 carries a water level 12, equipped with electrical contacts. On the bridge 20, there is an adjusting motor 15 controlled by the water level 12, and the axis of which is formed by a spindle which readjusts the arm 11 into a horizontal position. The control of the electric motor 15 with regard to its sense of rotation is effected by the water level 12 with the electrical contacts.

A similar pivotable arm 13 is arranged on the post of the bridge arm 21. This arm carries two photodiodes 14, which control the servomotor 16 arranged on the bridge 21. The axis of the motor 16 forms also a spindle which causes the angular readjustment of the arm 13 until the photodiodes 14 are aligned onto the height of the measuring chord at the moment. The lamp associated with the photodiodes is shown at 18. Servomechanisms controlled by the photodiodes, for readjusting a height indication of an object are known in the art. Each end of the arms 11, 13 is equipped with a rope pull 17, the guide pulleys of which are arranged on the measuring axis 10 and the bridge arms 20, 21, respectively and operate recorder pens 30, 19 which record recording curves on a recording tape 22.

The measuring principle is shown in FIGS. 3 to 6.

In these figures, 0—0 is the horizontal line. In FIG. 3, the left rail is super-elevated against the right rail; for this reason, the arm 11 is slightly pivoted upwardly against a straight line 10' parallel to the measuring axis 10. This pivoting, caused by readjusting through the motor 15, is recorded by the pen 30. The measuring chord 9 has not altered its position relative to the photodiodes and the arm 13 has therefore not been adjusted. In FIG. 4, the right rail is shown super-elevated against the left rail, and accordingly, the arm 11 has been pivoted slightly downwardly against the straight line 10' parallel to the measuring spindle. This means a deflection of the recorder pen 30 towards the opposite side.

In FIG. 5, the measuring axis 10 is lowered against the line 0—0 assumed to represent the zero position, but extends parallel to this line 0—0. This is the case, where the rails are lower at the point of the measuring spindle 10 than at the axles 3 and 4. Accordingly, the chord appears higher than the measuring spindle 10 and the servomotor 16 pivots the arm 13 upwardly. This pivoting is recorded by the recorder pen 19.

The opposite is the case in FIG. 6, i.e., the measuring spindle 10 appears higher than the straight line 0—0 and its distance relative to the chord 9 is smaller. Accordingly, the photodiode arrangement 14 causes the arm 13 to be lowered in the direction of the measuring spindle 10. Also this lowering of the arm 13 is recorded by the pen 19, but as a deflection in the direction opposite to that of FIG. 5. Instead of arranging a pivotable arm 13 on the measuring axis substantially in the centre of the transverse chord 9, which measures and records the height deviation of the centre of the transverse chord 9, a pivotable arm 13 may be arranged at each end of the transverse chord 9, immediately adjacently to the longitudinal rods or chords 7, 8; these arms respond to the height of the measuring spindle 10 relative to the longitudinal chords 7, 8 and are controlled by corresponding photodiodes and control in turn via a servomotor, corresponding to the servomotor 16, recording devices. Then the recording tape shows, in addition to the obliqueness, measured by the water level arm 11, also the relative height of both longitudinal chords 7, 8 relative to the measuring spindle, in the form of two distinct curves.

What I claim is:
1. Apparatus for measuring super-elevation of one rail with respect to the other and the vertical deviation of the transverse horizontal line of the track with respect to a reference horizontal line, said apparatus comprising a first wheel pair assembly and a second wheel pair assembly adapted to be mounted on a track in longitudinally spaced relation, said wheel pairs being independently vertically movable with respect to each other, a connecting rod connecting one wheel from one pair with the respective wheel of the other wheel pair on each rail, a transverse rod connected between the centers of the two connecting rods, a measuring spindle equipped with wheels adapted to ride on the track positioned near and parallel to the transverse rod, a level sensitive switch, means pivotally mounting the level sensitive switch on said measuring spindle responsive to the super elevation of one rail with respect to the other, a servomotor responsive to said level sensitive switch, recorder means operatively associated with said servomotor for recording super elevation, photoelectric means mounted on the measuring spindle to sense relative vertical movement between the said spindle and the transverse rod, a servomotor responsive to said photoelectric means, and recordr means operatively associated with said servomotor for recording vertical deviation between the spindle and the transverse rod.

2. The invention as set forth in claim 1 and wherein the means pivotally mounting the level sensitive switch is a lever pivotally mounted on the measuring spindle, and the servomotor is connected to said lever to pivot it in response to the position of the level sensitive switch.

3. The invention as set forth in claim 2 and wherein the lever is operatively connected to the recorder to record super elevation of one rail with respect to the other.

4. The invention as set forth in claim 2 and wherein the photosensitive means mounted on the measuring spindle comprises an arm pivotally carried on the measuring spindle, a photo diode assembly with the movable diodes mounted on the pivotal arm for determining relative vertical displacement from the transverse bar and wherein the servomotor is connected to the arm to pivot it in response to the photo diode assembly.

5. The invention as set forth in claim 4, and wherein the arm is operatively connected to the recorder which records the vertical deviation between the measuring spindle and the transverse bar.

References Cited
UNITED STATES PATENTS

| | | | |
|---|---|---|---|
| 926,770 | 7/1909 | Roller | 33—145 |
| 3,271,650 | 9/1966 | Riddle. | |
| 3,198,949 | 8/1965 | Holda | 250—202 |
| 3,389,469 | 6/1968 | Plasser et al. | 104—8 |
| 2,974,607 | 3/1961 | Talboys | 33—60 |

LEONARD FORMAN, Primary Examiner

S. L. STEPHAN, Assistant Examiner

U.S. Cl. X.R.

250—202; 104—7; 33—145, 86